(12) United States Patent
Jammulamadaka

(10) Patent No.: US 10,161,513 B2
(45) Date of Patent: Dec. 25, 2018

(54) METHOD OF EVALUATING THERMAL EFFECT OF TORQUE CONVERTER CLUTCH SLIP SPEED CALIBRATION SETTINGS ON A TORQUE CONVERTER

(71) Applicant: GM GLOBAL TECHNOLOGY OPERATIONS LLC, Detroit, MI (US)

(72) Inventor: Anand Kapardi Jammulamadaka, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 435 days.

(21) Appl. No.: 15/010,610

(22) Filed: Jan. 29, 2016

(65) Prior Publication Data
US 2017/0219094 A1    Aug. 3, 2017

(51) Int. Cl.
*G06F 17/50* (2006.01)
*F16H 61/14* (2006.01)

(52) U.S. Cl.
CPC ....... *F16H 61/143* (2013.01); *G06F 17/5009* (2013.01); *G06F 17/5095* (2013.01); *F16H 2061/145* (2013.01)

(58) Field of Classification Search
CPC . G06F 17/5009; G06F 17/5095; F16H 61/143

USPC .................................................. 703/2, 5, 18
See application file for complete search history.

(56) References Cited

U.S. PATENT DOCUMENTS

| 6,754,603 | B2 * | 6/2004 | Turbett | G01M 13/021 180/337 |
|---|---|---|---|---|
| 9,435,249 | B2 * | 9/2016 | Ruby | F01P 11/14 |
| 2007/0260373 | A1 * | 11/2007 | Langer | G01M 17/007 701/31.4 |
| 2015/0300239 | A1 * | 10/2015 | Ruby | F01P 11/14 701/99 |

* cited by examiner

*Primary Examiner* — Thai Q Phan
(74) *Attorney, Agent, or Firm* — Quinn IP Law

(57) ABSTRACT

A method of evaluating a thermal effect of torque converter clutch slip speed calibration settings on a torque converter includes estimating values of a plurality of vehicle operating parameters with a drive simulation model on a computer. The drive simulation model uses drive cycle inputs of a test drive cycle, and a slip speed calibration table to estimate values of the plurality of vehicle operating parameters over a pre-defined period of time for the test drive cycle. The temperature of each of a plurality of discrete regions of the torque converter are estimated with a temperature model on the computer. The temperature model uses the estimated values of the vehicle operating parameters to estimate the temperature of each discrete region of the torque converter at different times during the pre-defined period of time of the test drive cycle.

20 Claims, 4 Drawing Sheets

METHOD OF EVALUATING THERMAL EFFECT OF TORQUE CONVERTER CLUTCH SLIP SPEED CALIBRATION SETTINGS ON A TORQUE CONVERTER

TECHNICAL FIELD

The disclosure generally relates to a method of evaluating a thermal effect of slip speed calibration settings for a torque converter clutch, on a torque converter.

BACKGROUND

A torque converter for an automatic transmission may include a torque converter clutch. When an engine output and a transmission input are operating at the same rotational speed, the torque converter clutch may be engaged to mechanically couple an impeller of the torque converter to a turbine of the torque converter to reduce energy losses associated with the fluid coupling provided by the torque converter. During some driving conditions, it is advantageous to allow a certain amount of clutch slip across the torque converter clutch, so that the impeller and the turbine may have a pre-defined amount of relative rotation therebetween.

The amount of torque converter clutch slip varies with different driving conditions. A transmission control module includes a torque converter clutch slip calibration table, which defines the desired amount of clutch slip for the current driving conditions. The transmission control module measures or senses different variables related to the current driving conditions, and uses those measured data points as inputs to select the desired clutch slip from the torque converter clutch slip calibration table. The values of the clutch slip are pre-defined, and stored in the torque converter clutch slip calibration table, in the memory of the transmission control module.

The different values for the amount of clutch slip for the different driving conditions must be defined to maintain an interface temperature of the friction surfaces of the torque converter clutch below a threshold temperature level. It is important to maintain the interface temperature of the torque converter clutch, i.e., the temperature between the friction surfaces of the torque converter clutch, to temperatures below the threshold temperature value, to prevent overheating and degradation of the transmission fluid.

SUMMARY

A method of evaluating a thermal effect of torque converter clutch slip speed calibration settings on a torque converter of a transmission is provided. The method includes defining a test drive cycle, which includes a plurality of drive cycle inputs over a pre-defined period of time. A slip speed calibration table defines a desired amount of slip in the torque converter clutch for differing values of a plurality of vehicle operating parameters. Values of the plurality of vehicle operating parameters are estimated with a drive simulation model, which is saved in a memory of a computer. The drive simulation model uses the drive cycle inputs of the test drive cycle and the slip speed calibration table to estimate values of the plurality of vehicle operating parameters over the pre-defined period of time for the test drive cycle. A plurality of discrete regions of the torque converter are defined, with each discrete region representing a discrete thermal mass of the torque converter. The temperature of each of the plurality of discrete regions of the torque converter are estimated with a temperature model, which is saved in the memory of the computer. The temperature model uses the estimated values of the plurality of vehicle operating parameters during the pre-defined period of time of the test drive cycle to estimate the temperature of each discrete region of the torque converter at different times during the pre-defined period of time of the test drive cycle. The estimated temperatures for each discrete region of the torque converter during the pre-defined period of time during the test drive cycle are compared to a threshold temperature value, to determine if the temperature of any of the discrete regions of the torque converter at any time during the pre-defined time period of the test drive cycle were greater than the threshold temperature value.

Accordingly, a designer may evaluate the effect of torque converter clutch slip speed calibration settings on a proposed torque converter design, without having to physically assembly a prototype of the torque converter and physically test the proposed design. By defining the proposed torque converter into different discrete regions to represent a specific thermal mass of the torque converter, and calculating or solving energy balance equations for each discrete region with the temperature model, the designer may simulate the thermal effect of different torque converter clutch slip speed calibration settings on the torque converter, without having a physical prototype of the proposed torque converter. This process improves the efficiency in the design of the torque converter for specific applications, by allowing the designer the ability to easily evaluate different design options, e.g., geometry, material, line pressures, etc., without having to build and test a physical prototype for each different design option.

The above features and advantages and other features and advantages of the present teachings are readily apparent from the following detailed description of the best modes for carrying out the teachings when taken in connection with the accompanying drawings.

DETAILED DESCRIPTION

Figure 1:
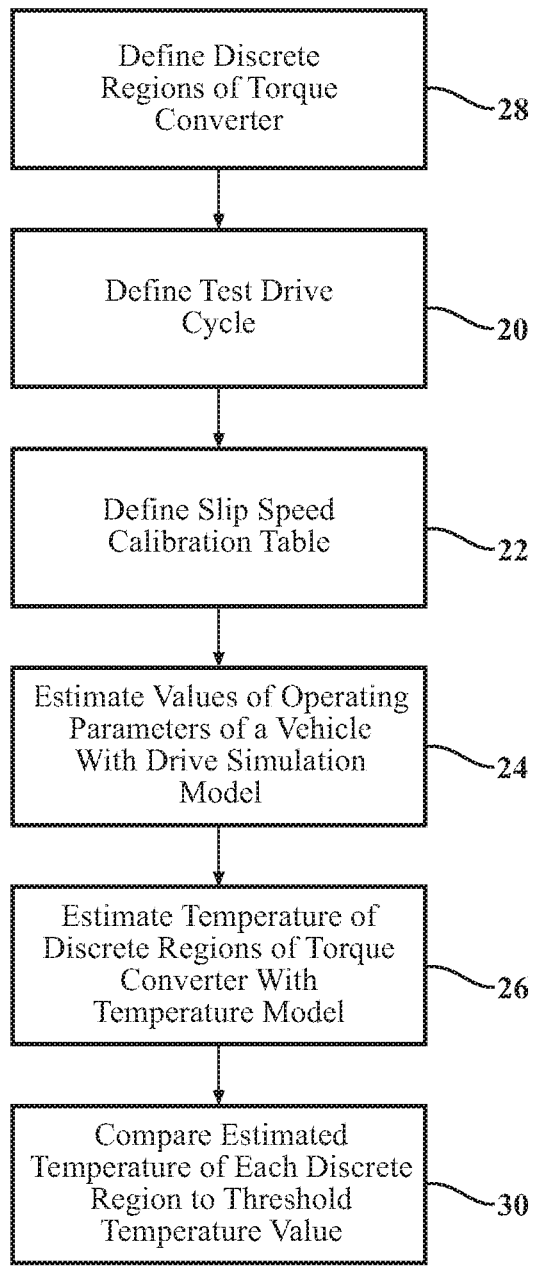
FIG. 1 is a flowchart showing a method of evaluating a thermal effect of slip speed calibration settings for a torque converter clutch, on a torque converter.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a method of evaluating a thermal effect of torque converter clutch slip speed calibration settings on a torque converter of a transmission is generally described. The method uses a specialized computer to model or estimate the temperature of discrete regions of a torque converter, in order to evaluate different clutch slip speed calibrations settings and/or different configurations of the torque converter. The evaluation process described herein is executed by the specialized computer, thereby allowing analysis of the clutch slip speed calibration settings and/or a proposed torque converter without the need to assembly and/or test a working prototype for each specific test.

The computer includes all software, hardware, memory, algorithms, connections, etc., necessary to execute the required steps of the process described herein. The computer may include one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The controller includes tangible, non-transitory memory on which are recorded computer-executable instructions, including a drive simulation model and a temperature model. The drive simulation model and the temperature model are specialized algorithms stored in the memory of the computer, and are used to execute some of the steps of the process described herein. The processor of the computer is configured for executing the drive simulation model and the temperature model.

Referring to FIG. 1, the evaluation process includes defining a test drive cycle. Defining the test drive cycle is generally indicated by box 20 shown in FIG. 1. The test drive cycle includes or defines a plurality of drive cycle inputs over a pre-defined period of time. The drive cycle inputs simulate driver inputs into a vehicle during the pre-defined time period to simulate a set of different driving and/or operating conditions. For example, the drive cycle inputs may include a throttle position input, a vehicle speed, a mass air inflow rate, etc. The drive cycle inputs change during the course of the pre-defined period of time to simulate changing driving conditions, i.e., changing vehicle operating conditions. For example, the drive cycle inputs may include a first engine torque request at a first time, maintaining that engine torque request for a duration, increasing the torque request at a second time, and then decreasing the torque request at a third time. The test drive cycle includes all drive cycle inputs necessary to simulate the operation of a specific vehicle in specific operating conditions during the pre-defined period of time.

The test drive cycle is designed/selected so as to enable assessment of controller performance under various operating conditions. Simulation scenarios include events that affect the torque converter clutch slip speed calibrations in both steady as well as transient operating conditions, and may include various gear states, engine speeds and loads in both towing and non-towing modes. Transient operating conditions include those associated with tip-ins, gear shifts, torque converter clutch apply/release, cylinder deactivation, etc. Steady operating conditions include those when none of the above transient events take place and can last for varying lengths of time. The test drive cycle could be of long duration (simulating several hours of driving) or of short duration simulating specific individual or stacked high energy events representing only a few seconds or minutes of actual driving time. The test drive cycle may include segments simulating driving conditions within the city and/or over the highway. The test drive cycle may be typically specified as vehicle speed vs time but could also be specified as a combination of pedal and brake vs time or other parameters such as acceleration, distance, etc. Once the test drive cycle is defined, the test drive cycle is stored in the memory of the computer.

A slip speed calibration table is also defined, and saved in the memory of the computer. Defining the slip speed calibration table is generally indicated by box 22 shown in FIG. 1. The slip speed calibration table defines a desired amount of slip in the torque converter clutch for differing values of a plurality of vehicle operating parameters. Accordingly, for any given combination of vehicle operating parameters, the slip speed calibration table defines and/or calculates the desired amount of torque slip in the torque converter clutch. The torque converter slip speed values provided in the calibration tables perform an important Noise Vibration Harshness (NVH) function. The torque converter slip speed values represent the necessary minimum slip speeds that guarantee a level of isolation of the driveline from the engine torque harmonics. The torsional vibrations transmitted downstream through the torque converter are thereby reduced improving the NVH characteristics of the driveline. The torque converter slip speed values are defined for both steady as well as transient operating conditions. In steady conditions the torque converter slip speed values can be a function of the load on the engine, the turbine speed, gear state, cylinder deactivation state, etc. In transient operating conditions the torque converter slip speed values can additionally be a function of rate of variation of the engine load. Full lockup of the Torque converter clutch occurs only above a calibrated vehicle speed.

Once the test drive cycle and the slip speed calibration table have been defined and are saved in the memory of the computer, the computer then estimates values of the plurality of vehicle operating parameters with the drive simulation model. Estimating the values of the operating parameters with the drive simulation model is generally indicated by box 24 shown in FIG. 1. The drive simulation model is a computer model that simulates the operation of the vehicle at different operating conditions. The vehicle operating parameters may include, but are not limited to, a torque converter clutch slip speed, a torque converter clutch applied torque, a line pressure to the torque converter clutch, etc. The drive simulation model uses the drive cycle inputs of the test drive cycle, and the slip speed calibration table to estimate values of the plurality of vehicle operating parameters over the pre-defined period of time for the test drive cycle. Accordingly, at any time during the pre-defined time period of the test drive cycle, the drive simulation model estimates the values for all of the different vehicle operating parameters. It should be appreciated that changing the drive cycle inputs will change the values of the vehicle operating parameters. Similarly, changing the slip speed calibration table will also change the values of the vehicle operating parameters output from the drive simulation model. Accordingly, it should be appreciated that the values of the vehicle operating parameters change over time during the pre-defined test period, because the drive cycle inputs change over time during the pre-defined test period of the test drive cycle. The estimated values of the plurality of vehicle operating parameters outputted by the drive simulation model are saved in the memory of the computer.

The values of all of the different vehicle operating parameters during the test drive cycle, that are outputted from the drive simulation model, are input into the temperature model, and used by the temperature model to estimate the temperature of the torque converter for the specific drive cycle inputs and slip speed calibration table settings input into the drive simulation model. Estimating the temperature of the torque converter is generally indicated by box 26 shown in FIG. 1. However, the temperature model does not estimate the temperature of the torque converter as a single unit. Rather, the temperature model estimates the temperature for different, discrete regions of the torque converter. In order to do so, the different discrete regions of the torque converter must be defined and saved in the memory of the computer. Defining the discrete regions of the torque converter is generally indicated by box 28 shown in FIG. 1.

Each discrete region of the torque converter represents a discrete thermal mass of the torque converter. The thermal mass of each discrete region is comprised of a thermal mass from the fluid in and circulating through that specific discrete region, as well as the thermal mass contributed by the solid mass of that specific discrete region. Accordingly, a solid mass for each respective discrete region must be defined and saved in the memory of the computer.

Figure 2:
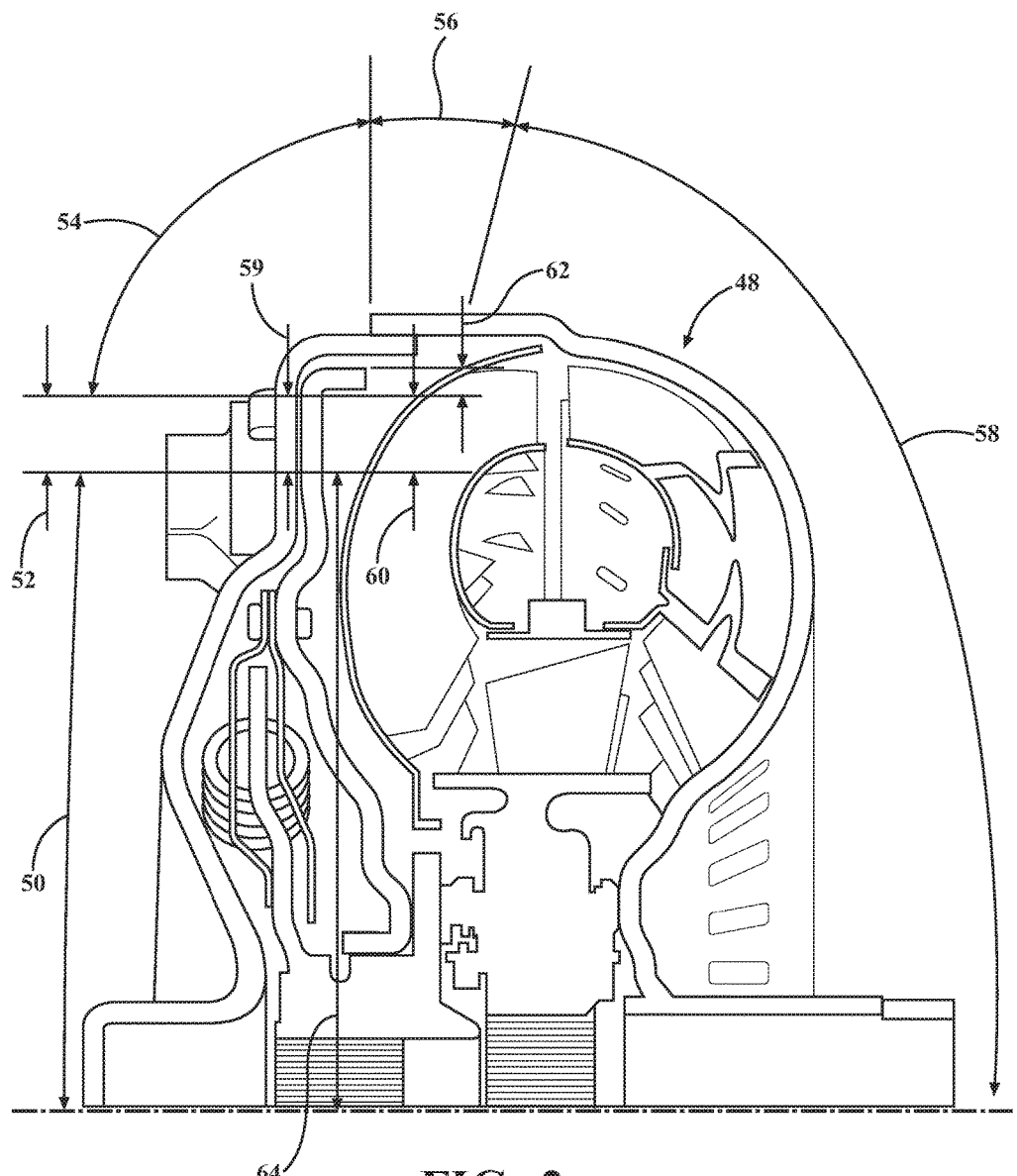
FIG. 2 is a schematic, fragmentary, cross sectional view of a torque converter, showing a plurality of different discrete regions.

For example, referring to FIG. 2, a plurality of discrete regions for an exemplary embodiment of a torque converter 48 are generally shown. As is shown, the exemplary embodiment of the torque converter 48 has been broken into five discrete regions, i.e., a first region 50, a second region 52, a third region 54, a fourth region 56, and a fifth region 58.

It should be appreciated that different embodiments of the torque converter 48 may be discretized in a different manner, to include more or less numbers of discrete regions. The exemplary manner in which the discrete regions of the exemplary torque converter 48 shown in FIG. 2 is described below. The details of the geometry, such as but not limited to the length, area, volume of various parts of the torque converter 48, may be obtained from a 3D CAD model of the torque converter 48. Measured values of the material properties for the solids as well as the transmission fluid such as density, specific heat, thermal conductivity, viscosity, etc, were used.

Discretization of the torque converter 48 geometry is driven by multiple considerations. The finer the discretization of the geometry the higher the accuracy of the transient simulation results. However, finer discretization increases the complexity of the model and also makes it computationally intensive to simulate over longer test drive cycles. Therefore, the intention in this effort is to achieve results of reasonably high accuracy while keeping the model simple. Keeping in mind these parameters, the following considerations went into the discretization of the exemplary torque converter 48 geometry shown in FIG. 2.

The torque converter 48 geometry is treated as axisymmetric. The structure is sectioned along the radial direction beginning at the torque converter 48 axis. The energy generated from friction (Hf) between the torque converter 48 clutch friction surface and the cover during slip is added as heat to the section of the cover experiencing the friction. This heat generation section on the torque converter 48 cover is lumped as a single thermal mass, and is shown in FIG. 2 as the second region 52. This enables tracking of the mean temperature of the torque converter 48 clutch. If more resolution of the temperature is desired within the second region 52, further segmentation can be done as per desired requirements.

The energy generated from friction ($H_f$) may be calculated from Equation 1 below.

$$H_f = T_f * \omega_f \quad \quad 1)$$

Referring to Equation 1), $H_f$ is the Friction Heat, $T_f$ is the torque converter 48 clutch Friction torque, and $\omega_f$ is the torque converter 48 clutch rotational slip speed.

The friction heat generation is assumed to be uniform across the friction area. Radially varying heat distributions can be considered along with finer discretization of the heat generation section.

The thermal mass of each segment is assumed to be concentrated at its mean effective radius. The mean effective radius is calculated as Equation 2 below.

$$r_{\mathit{eff}} = \frac{\int dm * r}{\int dm} \quad \quad 2)$$

Referring to Equation 2), $r_{\mathit{eff}}$ is mean effective radius, m is mass, and r is radius. The length of the heat flow path between two adjoining segments is the sum of the segment section lengths between the mass centers of the two segments.

The first region 50 is lumped as a single thermal mass. The structure is sectioned at joints in the structure and/or transition points between different materials. The third region 54 shown in FIG. 2 is a result of a section due to a joint. A contact thermal resistance is provided at such interfaces.

The mass center of a segment is designed to lie at the temperature measurement location. Therefore, the location of the temperature measurement points also determine the sectioning of the geometry. The fourth region 56 shown in FIG. 2 provides such a temperature measurement location. The fifth region 58 is lumped as a single thermal mass.

As noted above, the friction material is lumped as a single thermal mass 59. The pressure plate is also sectioned in a similar way as the torque converter 48 cover. The section directly in contact with the friction material is lumped as one thermal mass 60. The outer section 62 and the inner section 64 are lumped as a single thermal masses.

Throughout the discretization of the torque converter 48, the Biot Number value less than or equal to 0.1 is satisfied, which is a widely accepted criterion for accuracy of lumped system representation. The Biot number value may be calculated from Equation 3 below.

$$\text{Biot Number} = hL/k \quad \quad 3)$$

Referring to Equation 3, h is the convective heat transfer coefficient, L is the Characteristic length of the body, and k is the thermal conductivity of material.

The temperature model uses a previous temperature value of each discrete region of the torque converter 48 to estimate the temperature of that discrete region at a subsequent time, during the test drive cycle. Accordingly, in order to enable the first temperature estimate for each discrete region, an initial temperature value for each discrete region of the torque converter 48 must be defined, and saved in the memory of the computer.

Once the values for all of the operating parameters have been output from the drive simulation model and saved in the memory of the computer, and all necessary information defining the discrete regions of the torque converter 48 have been input into the computer, the computer then estimates the temperature of each of the plurality of discrete regions of the torque converter 48 with the temperature model. As noted above, estimating the temperature of the discrete regions of the torque converter 48 is generally indicated by box 26 shown in FIG. 1. The temperature model uses the estimated values of the plurality of vehicle operating parameters during the pre-defined period of time of the test drive cycle to estimate the temperature of each discrete region of the torque converter 48 at different times during the pre-defined period of time of the test drive cycle. The estimated temperatures for each discrete region of the torque converter 48 clutch, during the pre-defined period of time of the test drive cycle, that are output by the temperature model, may be saved in the memory of the computer.

Estimating the temperature of each of the plurality of discrete regions of the torque converter 48 with the temperature model includes calculating a volume of fluid circulating through each respective discrete region. The volume of fluid for each discrete region is used to calculate the thermal mass for each discrete region that is due to the fluid in and circulating through that respective discrete region.

The temperature of each of the plurality of discrete regions of the torque converter 48 are estimated by calculating the sum of a change in temperature over time in each respective discrete region due to the volume of fluid circulating through each respective discrete region during the test drive cycle, and a change in temperature over time of the solid mass in each respective discrete region during the test drive cycle.

Calculating the change in temperature over time in each respective discrete region due to the volume of fluid circulating through each respective discrete region includes solving Equation 4 for each discrete region of the torque converter 48. Equation 4 is a volumetric fluid energy balance equation, and is provided below.

$$\frac{dT}{dt} = \frac{(H_{in}\dot{M}_{in} - H_{out}\dot{M}_{out}) - H(\dot{M}_{in} - \dot{M}_{out}) + \dot{Q} + \sum_{walls} h_i A_i (T - T_i)}{\rho C_p (V + V_{out} - V_{in})} + \frac{1}{\rho}\frac{dP}{dt} \quad 4)$$

Referring to Equation 4, $$\frac{dT}{dt}$$

is defined as a change in temperature over a change in time, $H_{in}$ is defined as the enthalpy into the discrete region, $\dot{M}_{in}$ is defined as the change in mass over time of the fluid entering the discrete region, $H_{out}$ is defined as the enthalpy out of the discrete region, $\dot{M}_{out}$ is defined as the change in mass over time of the fluid leaving the discrete region, H is defined as the enthalpy of the discrete region, $\dot{Q}$ is defined as the change in heat over time, h is the wall heat transfer coefficient for each discrete region, A is the area of the wall of the discrete region, T is defined as the current temperature of the fluid, $T_i$ is defined as the temperature of the fluid at a previous time, $$\frac{dP}{dt}$$

is defined as a change in pressure over a change in time, ρ is the density of the fluid, $C_p$ is defined as the specific heat of the fluid, V is the volume of fluid in the discrete region, $V_{out}$ is defined as the volume of fluid leaving the discrete region, and $V_{in}$ is defined as the volume of fluid entering the discrete region.

Calculating the change in temperature over time of the solid mass in each respective discrete region includes solving Equation 4 for each discrete region of the torque converter 48. Equation 5 is a mass energy balance equation, and is provided below.

$$mC_p \frac{dT}{dt} = \dot{Q}_{in} + \sum h_i A_i (T_i - T) + \sum \left(\frac{kA}{L}\right)_{i\_equiv} (T_i - T) + \sigma \sum \varepsilon_i A_i (T_a^4 - T^4) \quad 5)$$

Referring to Equation 5, m is defined as mass of the solid, $C_p$ is defined as the specific heat of the solid material in the discrete region, $$\frac{dT}{dt}$$

is defined as a change in temperature over a change in time, $\dot{Q}_{in}$ is defined as the change in heat added over time, h is defined as the wall heat transfer coefficient for each discrete region, A is defined as the area of the wall of the discrete region, T is defined as the current temperature of the fluid, $T_i$ is defined as the temperature of the fluid at a previous time, k is defined as the thermal conductivity of the of the solid mass in the discrete region, L is defined as the length of the solid mass in the discrete region, σ is defined as Stefan-Boltman's constant (5.67*10$^{-8}$ W/m$^2$/K$^4$), ε is defined as the radiation emissivity of the solid mass of the discrete region, and $T_a$ is defined as the temperature of the air.

In order to determine the heat into and out of each respective discrete region, the heat into and out of the adjoining discrete regions must also be known. Accordingly, estimating the temperature of a respective one of the plurality of discrete regions of the torque converter 48 with the temperature model, at a respective time during the pre-defined time period of the test drive cycle, includes using the temperature of at least one other of the plurality of discrete regions of the torque converter 48 to estimate the temperature of the respective discrete region of the torque converter 48 at that respective time during the pre-defined time period of the test drive cycle. For example, the temperature of the second region 52 at a specific time is effected by and dependent upon the temperatures of the first region 50 and the third region 54 at that specific time.

The process of estimating the temperature of each discrete region is an ongoing, continuous process that is performed at several distinct times during the test drive cycle. Accordingly, the computer continuously redefines the temperature for each discrete region of the torque converter 48 during the pre-defined time period of the drive test cycle at each time increment, and then uses that redefined temperature value to estimate the temperature value at the next time increment. This process continues for the duration of the drive test cycle. The time increments may be as small as possible in order to properly evaluate the thermal effect on the torque converter 48.

Once the temperature values for the different discrete regions have been output from the temperature model, the estimated temperatures for each discrete region of the torque converter 48 during the pre-defined period of time during the test drive cycle may then be compared to a threshold temperature value. Comparing the estimated temperatures of each discrete region of the torque converter 48 to the threshold temperature value is generally indicated by box 30 shown in FIG. 1. The threshold temperature value is the critical temperature that the transmission fluid should not exceed in order to assure continued, proper operation of the transmission fluid without degradation. As such, if the temperature of one or more of the discrete regions rises above the threshold temperature value, then the transmission fluid may be degraded from the high heat, and the useful life of the transmission fluid may be reduced. The temperatures of each discrete region at all times during the test drive cycle may be compared to the threshold temperature value to determine if the temperature of any of the discrete regions of the torque converter 48 at any time during the pre-defined time period of the test drive cycle were greater than the threshold temperature value.

The output temperature estimates from the temperature model may be compared to the temperature threshold value in any suitable manner, such as through visual inspection, or automatically by the computer. If the computer compares the temperature estimates to the threshold temperature value, then the computer may change a state of an indicator value, saved in the memory of the computer, to a first state. The first state is used to indicate a positive evaluation when the temperature of all of the discrete regions of the torque converter 48 at any time during the pre-defined time period of the test drive cycle, were not greater than the threshold temperature value. The computer may change the state of the indicator value to a second state to indicate a negative evaluation, when the temperature of any of the discrete regions of the torque converter 48 at any time during the pre-defined time period of the test drive cycle were equal to or greater than the threshold temperature value. The indicator value may include a value that is stored in the memory of the computer, and used to indicate the results of the evaluation process. The indicator value may be linked to and/or referenced by an indication device, such as an alert, visual signal, screen output, etc., that is used to convey the results of the evaluation process to the technician performing the process.

The results of the evaluation process described above provides useful feedback to designers, allowing the designers to simulate the effect of design changes, in either the torque converter 48 or the clutch slip speed calibration settings, without having to build a physical prototype for each design change. This evaluation process increases the efficiency of the design process. Additionally, the evaluation process allows for the clutch slip speed calibration settings to be easily adjusted and/or modified until an optimum definition is decided upon. As is known, the final clutch slip speed calibration settings are saved in a transmission control module of a vehicle, and are used by the transmission control module to control the operation of the torque converter 48 clutch during operation of the vehicle. Accordingly, the process described above provides an improved process for providing the optimum values for the clutch slip speed calibration settings.

Figure 3:
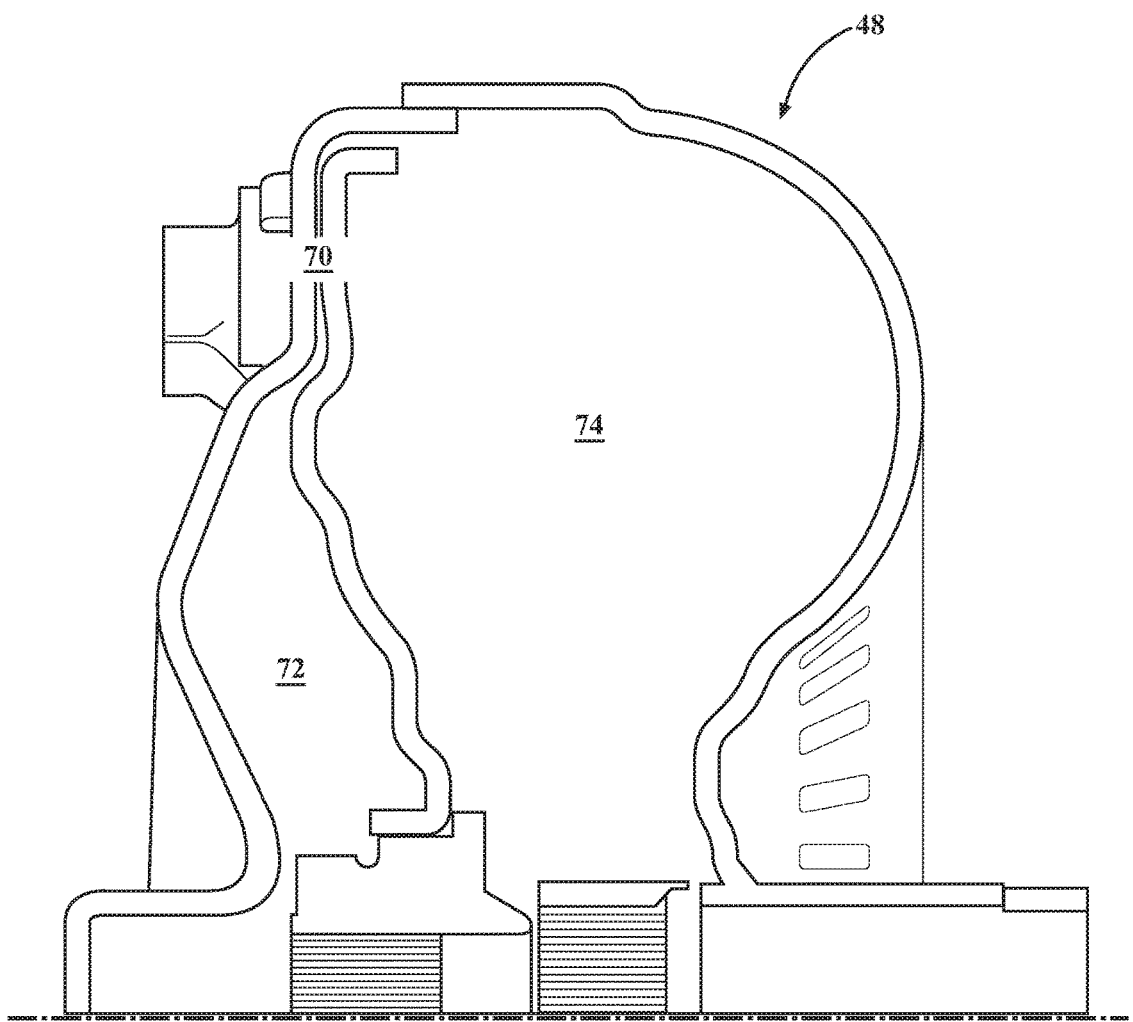
FIG. 3 is a schematic, fragmentary, cross sectional view of the torque converter showing different fluid volumes.

The heat transfer through conduction between the cover, pressure plate, turbine, impeller, etc., at the hub may be neglected. The fluid volume may be calculated from the volume of the region enclosed naturally within the solid structures which contain the automatic transmission fluid (ATF). The sectioning of the fluid domain is done to facilitate the correct heat transfer to and from the surrounding solids. Each fluid volume is assumed to be a homogenously mixed control volume. Referring to FIG. 3, the fluid between the friction pad and the cover is lumped as a single volume 70. While the volume of fluid lying on the release side of the torque converter 48 is lumped as a single fluid volume 72. Similarly the volume of fluid on the apply side is lumped as a single volume 74. Above sectioning of the fluid domain models the heat transfer with reasonable accuracy.

Figure 4:
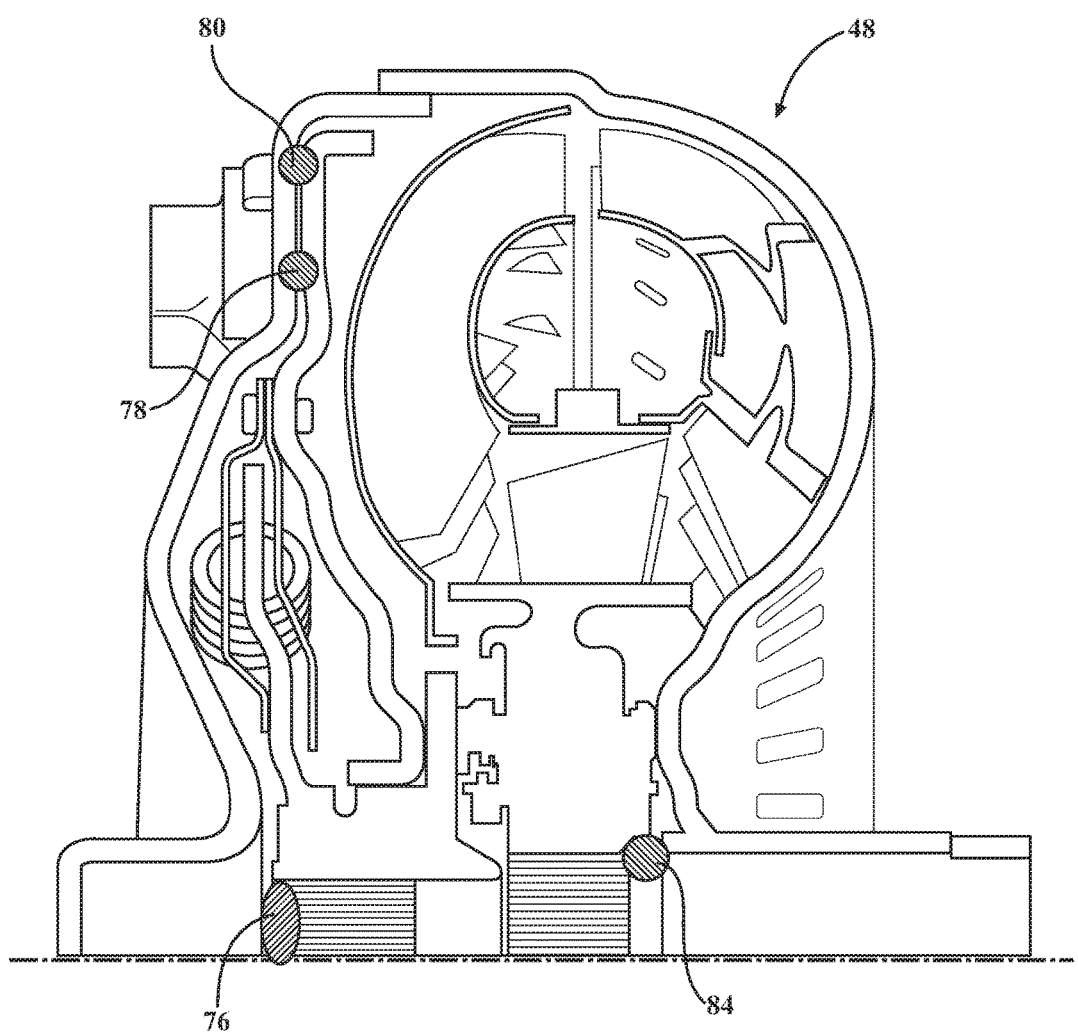
FIG. 4 is a schematic, fragmentary, cross sectional view of the torque converter showing different orifices.

Additional flow paths can be modeled using pipe elements to represent the flow through grooves when such features exist in the clutch friction pad. The fluid flow from the release side to the apply side and vice-versa may be determined by the pressure difference across these regions which act as boundary conditions for the flow. Flow may be assumed to be laminar. Referring to FIG. 4, the resistances encountered by the fluid flowing through the narrow passages from the release side to the apply side may be modeled through orifices (76, 78, 80, 84 in FIG. 4) representing the cross-section areas of passages' inlet and exit. A first orifice models the flow inlet on the release side, and is generally shown at 76. A second orifice represents the flow inlet, and is generally shown at 78. A third orifice represents the flow outlet to the passage between the friction areas for the release fluid, and is generally shown at 80. A fourth orifice represents the flow inlet on the apply side, and is generally shown at 84.

The mass flow rate through an orifice is defined by Equation 6 below.

$$\dot{m} = c_q A \sqrt{2\rho \Delta P} \qquad 6)$$

Referring to Equation 6, $\dot{m}$ is the mass flow rate through an orifice, $c_q$ is the flow discharge coefficient, A is the cross-section flow area, $\rho$ is the fluid density, and $\Delta P$ is the pressure difference across an orifice.

The flow resistance for flow through a passage in fluid volume Vr and Vf is modeled as an annular pipe. The centrifugal effects is added using a rotating pipe element. The flow resistance for flow through Va is neglected. Flow through annular pipe may be calculated from Equation 7 below.

$$Q = \frac{\pi D_o (D_o - D_i)^3 \Delta P}{12 * 8 * l \nu \rho} \qquad 7)$$

Referring to Equation 7, Q is the volumetric flow rate through a pipe, $D_o$ is the outer diameter of an annulus, $D_i$ is the inner diameter of the annulus, l is the length of the pipe section, $\nu$ is the fluid kinematic viscosity, $\rho$ is the fluid density, and $\Delta P$ is the pressure difference across the pipe section.

The mean fluid velocity accounting for centrifugal effects may be calculated from Equation 8 below.

$$v = \frac{(\Delta P + \rho\omega^2(r_2^2 - r_1^2)/2)D^2}{32l\rho v} \quad 8)$$

Referring to Equation 8, $\omega$ is the rotational speed, $\rho$ is the fluid density, $r_1$ is the inner radius of the rotating section, $r_2$ is the outer radius of the rotating section, D is the hydraulic diameter of the pipe cross-section, l is the length of the pipe section, $\rho$ is the density of fluid, and v is the kinematic viscosity of fluid.

The volume of fluid Vf changes during torque converter 48 clutch apply/release. This is implemented as a linear change between maximum and minimum volumes as the torque converter 48 clutch is applied or released. At full application of the torque converter 48 clutch, the minimum volume is specified to represent the porosity of the friction material and orifice sizes are reduced to replicate the flow through the porous material, the actual values for which is obtained from test data.

All the cover segments have conductive, convective and radiation forms of heat transfer. The friction material has convective heat transfer with the fluid, conductive heat transfer with the pressure plate and conductive heat transfer with the cover when the torque converter 48 clutch is applied. The pressure plate, in addition, has convective heat transfer to the fluid. Conduction between two materials with contact thermal resistance is modeled using Equation 9) below.

$$\dot{H} = \frac{1}{\left(\frac{l_1}{k_1 A} + \frac{l_2}{k_2 A} + r\right)}(T_2 - T_1) \quad 9)$$

Referring to Equation 9, $\dot{H}$ is the heat transferred through conduction, $l_1$ is the distance from geometric center of segment 1 to the interface with segment 2, $l_2$ is the distance from geometric center of segment 2 to the interface with segment 1, A is the cross-section area through which conduction takes place, r is the contact thermal resistance, $T_1$ is the temperature of segment 1, and $T_2$ is the temperature of segment 2.

Convection heat exchange may be modeled from Equation 10) below.

$$\dot{H} = hA(T_f - T_s) \quad 10)$$

Referring to Equation 10), $\dot{H}$ is the heat transferred through convection, A is the surface area through which convection takes place, $T_f$ is the temperature of fluid, and $T_s$ is the temperature of segment.

Radiation heat exchange may be modeled from Equation 11) below.

$$\dot{H} = \sigma\varepsilon A(T_a^4 - T_s^4) \quad 11)$$

Referring to Equation 11), $\dot{H}$ is the heat transferred through radiation, A is the surface area through which radiation takes place, $\sigma$ is the Stefan-boltzman's constant (=5.67*10$^{-8}$ W/m$^2$/K$^4$), $\varepsilon$ is the emission factor for the surface, $T_a$ is the temperature of air, and $T_s$ is the temperature of the segment.

The surface areas for convective and radiation heat transfer were estimated from the CAD geometry. Surface of the segment wetted by the transmission fluid is considered for convective heat transfer area, while the surface exposed to air is considered for the radiation heat transfer area. The energy lost from the hydraulic coupling of the torque converter 48 is added to the fluid volume Va. Power loss from torque converter 48 efficiency may be modeled by Equation 12 below.

$$\dot{H} = (\omega_1 T_1 - \omega_t T_t) \quad 12)$$

Referring to Equation 12), $\dot{H}$ is the heat transferred through radiation, $\omega_t$ is a rotational speed, and $T_t$ is the hydrodynamic torque on the impeller of the torque converter 48.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of evaluating a thermal effect of torque converter clutch slip speed calibration settings on a torque converter of a transmission, the method comprising:
   defining a test drive cycle to include a plurality of drive cycle inputs over a pre-defined period of time;
   defining a slip speed calibration table that defines a desired amount of slip in the torque converter clutch for differing values of a plurality of vehicle operating parameters;
   estimating values of the plurality of vehicle operating parameters with a drive simulation model saved in a memory of a computer, wherein the drive simulation model uses the drive cycle inputs of the test drive cycle and the slip speed calibration table to estimate values of the plurality of vehicle operating parameters over the pre-defined period of time for the test drive cycle;
   defining a plurality of discrete regions of the torque converter, with each discrete region representing a discrete thermal mass of the torque converter;
   estimating the temperature of each of the plurality of discrete regions of the torque converter with a temperature model saved in the memory of the computer, wherein the temperature model uses the estimated values of the plurality of vehicle operating parameters during the pre-defined period of time of the test drive cycle to estimate the temperature of each discrete region of the torque converter at different times during the pre-defined period of time of the test drive cycle; and
   comparing the estimated temperatures for each discrete region of the torque converter during the pre-defined period of time during the test drive cycle to a threshold temperature value to determine if the temperature of any of the discrete regions of the torque converter at any time during the pre-defined time period of the test drive cycle were greater than the threshold temperature value.

2. The method set forth in claim 1 further comprising changing a state of an indicator value, saved in the memory of the computer, to a first state to indicate a positive evaluation when the temperature of all of the discrete regions of the torque converter at all times during the pre-defined time period of the test drive cycle, were not greater than the threshold temperature value.

3. The method set forth in claim 2 further comprising changing the state of the indicator value, saved in the memory of the computer, to a second state to indicate a negative evaluation when the temperature of any of the discrete regions of the torque converter at any time during the pre-defined time period of the test drive cycle were equal to or greater than the threshold temperature value.

4. The method set forth in claim 1 wherein estimating the temperature of each of the plurality of discrete regions of the torque converter includes calculating a change in temperature over time in each respective discrete region due to a volume of fluid circulating through each respective discrete region during the test drive cycle.

5. The method set forth in claim 4 wherein calculating the change in temperature over time in each respective discrete region due to the volume of fluid circulating through each respective discrete region includes solving a volumetric fluid energy balance equation:

$$\frac{dT}{dt} = \frac{(H_{in}\dot{M}_{in} - H_{out}\dot{M}_{out}) - H(\dot{M}_{in} - \dot{M}_{out}) + \dot{Q} + \sum_{walls} h_i A_i (T - T_i)}{\rho C_p (V + V_{out} - V_{in})} + \frac{1}{\rho}\frac{dP}{dt}$$

wherein $$\frac{dT}{dt}$$

is a change in temperature over a change in time, $H_{in}$ is the enthalpy into the discrete region, $\dot{M}_{in}$ is the change in mass over time of the fluid entering the discrete region, $H_{out}$ is the enthalpy out of the discrete region, $\dot{M}_{out}$ is the change in mass over time of the fluid leaving the discrete region, H is the enthalpy of the discrete region, $\dot{Q}$ is the change in heat over time, h is the wall heat transfer coefficient for each discrete region, A is the area of the wall of the discrete region, T is the current temperature of the fluid, $T_i$ is the temperature of the fluid at a previous time, $$\frac{dP}{dt}$$

is a change in pressure over a change in time, ρ is the density of the fluid, $C_p$ is the specific heat of the fluid, V is the volume of fluid in the discrete region, $V_{out}$ is the volume of fluid leaving the discrete region, and Vin is the volume of fluid entering the discrete region.

6. The method set forth in claim 4 wherein estimating the temperature of each of the plurality of discrete regions of the torque converter includes calculating a change in temperature over time of a solid mass in each respective discrete region during the test drive cycle.

7. The method set forth in claim 6 wherein calculating the change in temperature over time of a solid mass in each respective discrete region includes solving a mass energy balance equation:

$$mC_p \frac{dT}{dt} = \dot{Q}_{in} + \sum h_i A_i (T_i - T) + \sum \left(\frac{kA}{L}\right)_{i\_equiv} (T_i - T) + \sigma \sum \varepsilon_i A_i (T_a^4 - T^4);$$

wherein m is the mass of the solid, $C_p$ is the specific heat of the solid material in the discrete region, $$\frac{dT}{dt}$$

is a change in temperature over a change in time, $\dot{Q}_{in}$ is the change in heat added over time, h is the wall heat transfer coefficient for each discrete region, A is the area of the wall of the discrete region, T is the current temperature of the fluid, $T_i$ is the temperature of the fluid at a previous time, k is the thermal conductivity of the of the solid mass in the discrete region, L is the length of the solid mass in the discrete region, σ is the Stefan-Boltzman's constant ($5.67*10^{-8}$ W/m²/K⁴), ε is the radiation emissivity of the solid mass of the discrete region, and $T_a$ is the temperature of the air.

8. The method set forth in claim 1 wherein defining a plurality of discrete regions of the torque converter includes defining a solid mass for each respective discrete region.

9. The method set forth in claim 1 wherein estimating the temperature of each of the plurality of discrete regions of the torque converter with the temperature model includes calculating a volume of fluid circulating through each respective discrete region.

10. The method set forth in claim 1 further comprising defining an initial temperature for each respective discrete region of the torque converter.

11. The method set forth in claim 10 further comprising continuously redefining the temperature for each discrete region of the torque converter during the pre-defined time period of the drive test cycle.

12. The method set forth in claim 11 wherein estimating the temperature of a respective one of the plurality of discrete regions of the torque converter with the temperature model, at a respective time during the pre-defined time period of the test drive cycle, includes using the temperature of at least one other of the plurality of discrete regions of the torque converter to estimate the temperature of the respective discrete region of the torque converter at that respective time during the pre-defined time period of the test drive cycle.

13. The method set forth in claim 1 further comprising:
saving the test drive cycle in the memory of the computer;
saving the slip speed calibration table in the memory of the computer;
saving the estimated values of the plurality of vehicle operating parameters in the memory of the computer; and
saving the estimated temperatures for each discrete region of the torque converter clutch during the pre-defined period of time during the test drive cycle in the memory of the computer.

14. The method set forth in claim 1 further comprising providing the computer, with the drive simulation model and the temperature model saved in the memory of the computer.

15. A method of evaluating a thermal effect of torque converter clutch slip speed calibration settings on a torque converter of a transmission, the method comprising:
defining a test drive cycle to include a plurality of drive cycle inputs over a pre-defined period of time;
defining a slip speed calibration table that defines a desired amount of slip in the torque converter clutch for any values of a plurality of vehicle operating parameters;
estimating values of the plurality of vehicle operating parameters with a drive simulation model saved in a memory of a computer, wherein the drive simulation model uses the drive cycle inputs of the test drive cycle and the slip speed calibration table to estimate values of the plurality of vehicle operating parameters over the pre-defined period of time for the test drive cycle;

defining a plurality of discrete regions of the torque converter, with each discrete region representing a discrete thermal mass of the torque converter;

defining an initial temperature for each respective discrete region of the torque converter;

estimating the temperature of each of the plurality of discrete regions of the torque converter with a temperature model saved in the memory of the computer, wherein the temperature model uses the estimated values of the plurality of vehicle operating parameters during the pre-defined period of time of the test drive cycle to estimate the temperature of each discrete region of the torque converter at any time during the pre-defined period of time of the test drive cycle;

wherein estimating the temperature of a respective one of the plurality of discrete regions of the torque converter with the temperature model, at a respective time during the pre-defined time period of the test drive cycle, includes using the temperature of at least one other of the plurality of discrete regions of the torque converter to estimate the temperature of the respective discrete region of the torque converter at that respective time during the pre-defined time period of the test drive cycle;

comparing the estimated temperatures for each discrete region of the torque converter during the pre-defined period of time during the test drive cycle to a threshold temperature value to determine if the temperature of any of the discrete regions of the torque converter at any time during the pre-defined time period of the test drive cycle were greater than the threshold temperature value;

changing a state of an indicator value, saved in the memory of the computer, to a first state to indicate a positive evaluation when the temperature of all of the discrete regions of the torque converter at all times during the pre-defined time period of the test drive cycle, were not greater than the threshold temperature value; and changing the state of the indicator value, saved in the memory of the computer, to a second state to indicate a negative evaluation when the temperature of any of the discrete regions of the torque converter at any time during the pre-defined time period of the test drive cycle were equal to or greater than the threshold temperature value.

16. The method set forth in claim 15 wherein estimating the temperature of each of the plurality of discrete regions of the torque converter includes calculating a change in temperature over time in each respective discrete region due to a volume of fluid circulating through each respective discrete region during the test drive cycle.

17. The method set forth in claim 16 wherein calculating the change in temperature over time in each respective discrete region due to the volume of fluid circulating through each respective discrete region includes solving a volumetric fluid energy balance equation:

$$\frac{dT}{dt} =$$

-continued $$\frac{(H_{in}\dot{M}_{in} - H_{out}\dot{M}_{out}) - H(\dot{M}_{in} - \dot{M}_{out}) + \dot{Q} + \sum_{walls} h_i A_i (T - T_i)}{\rho C_p (V + V_{out} - V_{in})} + \frac{1}{\rho}\frac{dP}{dt}$$

wherein $$\frac{dT}{dt}$$

is a change in temperature over a change in time, $H_{in}$ is the enthalpy into the discrete region, $\dot{M}_{in}$ is the change in mass over time of the fluid entering the discrete region, $H_{out}$ is the enthalpy out of the discrete region, $\dot{M}_{out}$ is the change in mass over time of the fluid leaving the discrete region, H is the enthalpy of the discrete region, $\dot{Q}$ is the change in heat over time, h is the wall heat transfer coefficient for each discrete region, A is the area of the wall of the discrete region, T is the current temperature of the fluid, $T_i$ is the temperature of the fluid at a previous time, $$\frac{dP}{dt}$$

is a change in pressure over a change in time, $\rho$ is the density of the fluid, $C_p$ is the specific heat of the fluid, V is the volume of fluid in the discrete region, $V_{out}$ is the volume of fluid leaving the discrete region, and Vin is the volume of fluid entering the discrete region.

18. The method set forth in claim 16 wherein estimating the temperature of each of the plurality of discrete regions of the torque converter includes calculating a change in temperature over time of a solid mass in each respective discrete region during the test drive cycle.

19. The method set forth in claim 18 wherein calculating the change in temperature over time of a solid mass in each respective discrete region includes solving a mass energy balance equation:

$$mC_p \frac{dT}{dt} = \dot{Q}_{in} + \sum h_i A_i (T_i - T) + \sum \left(\frac{kA}{L}\right)_{i\_equiv} (T_i - T) + \sigma \sum \varepsilon_i A_i (T_a^4 - T^4);$$

wherein m is the mass of the solid, $C_p$ is the specific heat of the solid material in the discrete region, $$\frac{dT}{dt}$$

is a change in temperature over a change in time, $\dot{Q}_{in}$ is the change in heat added over time, h is the wall heat transfer coefficient for each discrete region, A is the area of the wall of the discrete region, T is the current temperature of the fluid, $T_i$ is the temperature of the fluid at a previous time, k is the thermal conductivity of the of the solid mass in the discrete region, L is the length of the solid mass in the discrete region, $\sigma$ is the Stefan-Boltzman's constant ($5.67*10^{-8}$ W/m$^2$/K$^4$), $\varepsilon$ is the radiation emissivity of the solid mass of the discrete region, and $T_a$ is the temperature of the air.

20. The method set forth in claim 15 wherein defining a plurality of discrete regions of the torque converter includes defining a solid mass for each respective discrete region.

\* \* \* \* \*